United States Patent

Wooten

[11] Patent Number: 5,621,898
[45] Date of Patent: Apr. 15, 1997

[54] ARBITER ORGANIZATION FOR SERIAL BUS TRANSFERS

[75] Inventor: David R. Wooten, Spring, Tex.

[73] Assignee: Compaq Computer Corporation, Houston, Tex.

[21] Appl. No.: 346,097

[22] Filed: Nov. 29, 1994

[51] Int. Cl.$^6$ .............................. G06F 13/14; H04L 12/56
[52] U.S. Cl. ...................... 395/297; 395/293; 370/462
[58] Field of Search ................................. 395/297, 304, 395/865, 293; 370/85.1, 85.6, 85, 85.2, 94.2, 60, 60.1

[56] References Cited

U.S. PATENT DOCUMENTS

| | | | |
|---|---|---|---|
| 4,593,282 | 6/1986 | Acampora et al. | 340/825.5 |
| 4,667,191 | 5/1987 | Comroe et al. | 340/825.5 |
| 4,669,079 | 5/1987 | Blum | 370/85 |
| 4,736,366 | 4/1988 | Rickard | 370/85 |
| 4,961,188 | 10/1990 | Lau | 370/94.2 |
| 4,969,120 | 11/1990 | Azevedo et al. | 395/297 |
| 4,980,886 | 12/1990 | Bernstein | 370/80 |
| 5,124,983 | 6/1992 | Landez et al. | 370/85.6 |
| 5,339,425 | 8/1994 | Vanderah et al. | 395/700 |
| 5,392,280 | 2/1995 | Zhong | 370/60 |
| 5,396,494 | 3/1995 | Roposh | 370/85.2 |
| 5,398,243 | 3/1995 | Aguilhon et al. | 370/85.6 |
| 5,402,416 | 3/1995 | Cieslak et al. | 370/60 |
| 5,440,698 | 8/1995 | Sindhu et al. | 395/200.08 |
| 5,463,624 | 10/1995 | Hogg et al. | 370/85.6 |

FOREIGN PATENT DOCUMENTS

| | | |
|---|---|---|
| 0346141 | 12/1989 | European Pat. Off. . |
| 0523874 | 1/1993 | European Pat. Off. . |
| 4266236 | 9/1992 | Japan . |

OTHER PUBLICATIONS

IBM Technical Disclosure Bulletin, vol. 36, No. 4, Apr. 1993 New York, US, pp. 59–62, 'Access to high-speed LAN via wireless media' (whole document).

Primary Examiner—Ayaz R. Sheikh
Attorney, Agent, or Firm—Pravel, Hewitt, Kimball & Krieger

[57] ABSTRACT

A serial bus host controller arbiter which organizes data transfer events into three categories, periodic data transfers, which are usually isochronous transfers; aperiodic transfers, which usually are asynchronous transfers; and control transfers. The arbiter fundamentally operates on a periodic basis. At the beginning of each period, the arbiter preferably alternates between periodic transfers and control transfers. When all of the periodic transfers have been completed, the arbiter then provides access to the various asynchronous transfers which are scheduled to occur, alternating with any remaining control transfers. The arbiter gives preference to the periodic events, and if any time within the period is available, which is referred to as the free time, control events are interleaved with periodic events until no free time remains or all are completed. Any remaining time in the period is used cycling through the aperiodic transfers. The arbiter of the preferred embodiment keeps a running total of free time during each period to determine if additional control or aperiodic transfers can occur.

18 Claims, 8 Drawing Sheets

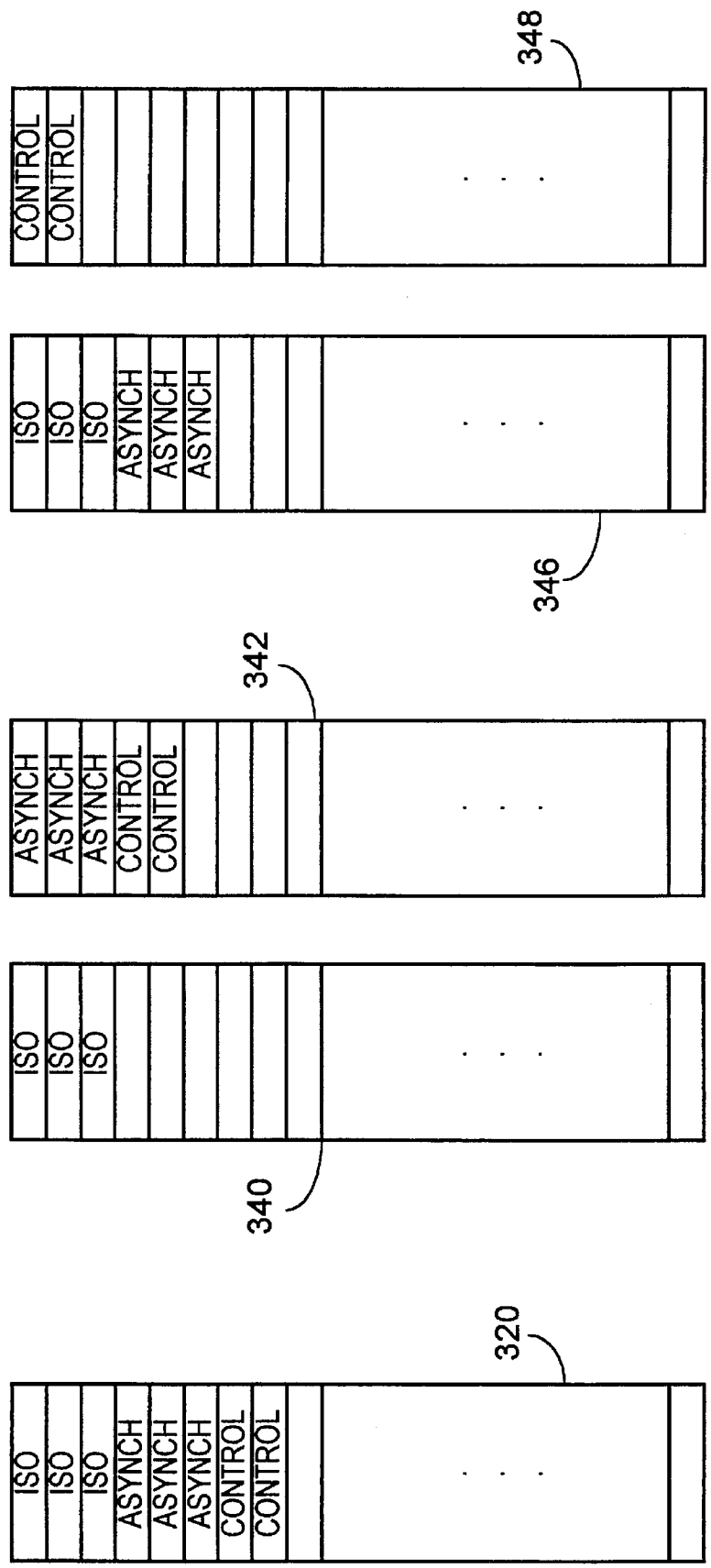

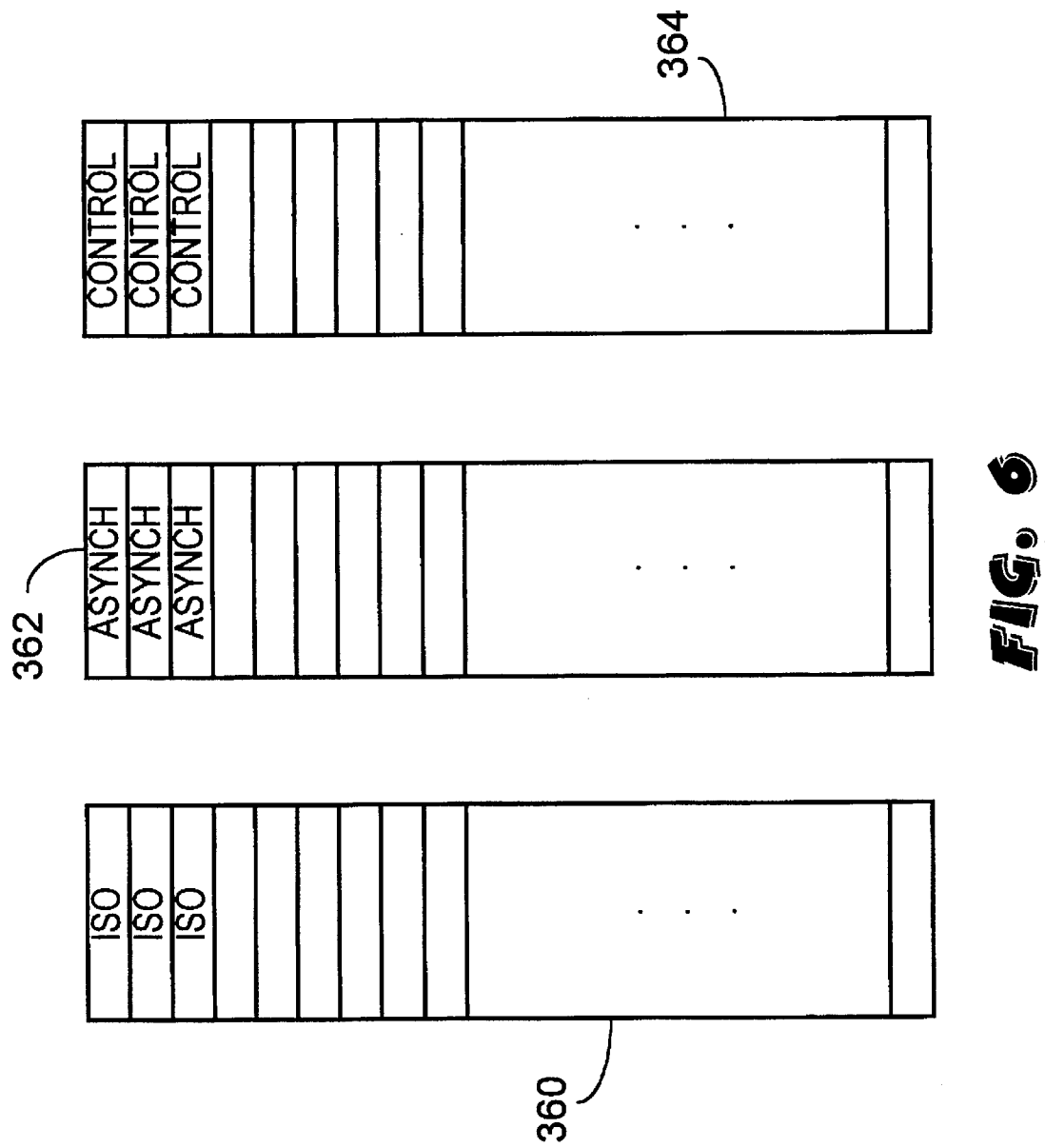

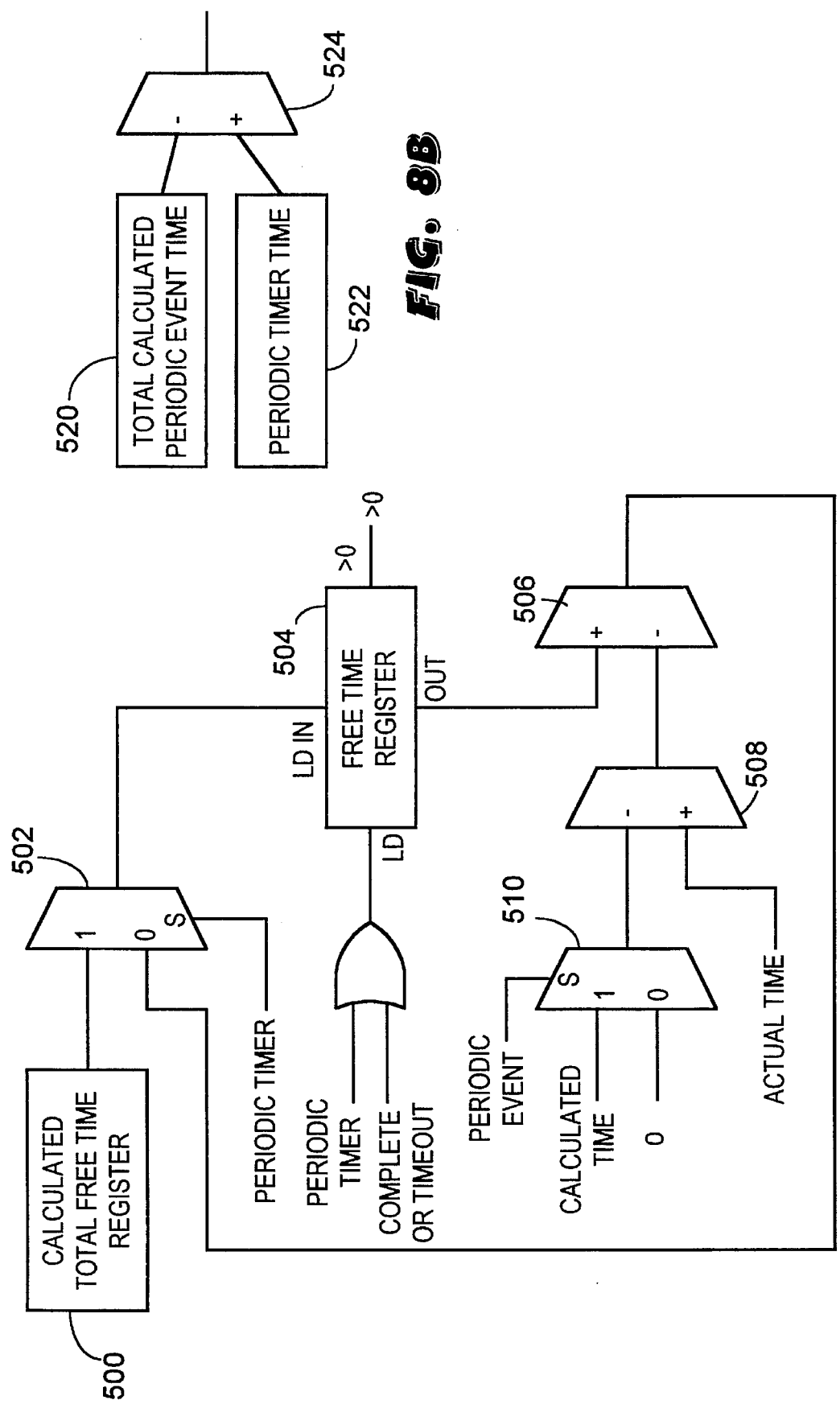

ARBITER ORGANIZATION FOR SERIAL BUS TRANSFERS

BACKGROUND OF THE INVENTION

1. Field of the Invention

The invention relates to serial bus transfers capable of handling several types of serial bus devices, and more particularly to an arbiter for managing operation and timing of device operations on the serial bus.

2. Description of the Related Art

Computer systems are becoming ever more powerful with each passing moment. Many new advanced bus structures such as PCI or Peripheral Component Interchange bus have been developed to allow greater performance of the computer system. Additionally, new devices and uses are being developed for the computer systems. In the past the computer has been essentially a standalone device or networked with other computer systems. However, today the modern personal computer is becoming a much more connected and multimedia oriented system. For example, now high speed video and audio functions are becoming commonplace and the integration with the telephone system has already begun.

However, many of these new features are well below the ultimate bandwidth or capability of the advanced buses such as the PCI bus. Therefore, it is not efficient to connect each one of the new functions and devices to the PCI bus directly, as this would impact bus loading and greatly increase overall costs. Additionally, many of these new functions are essentially serial in nature, with the data transferred in a bit stream rather than over a parallel bus structure. This is provided for many reasons, such as reduced wiring costs and can be done because of the lower data rates which are required.

Therefore, it has been proposed to develop a serial bus organization to connect all of these various lower bandwidth devices. The serial bus is organized with a host controller having a series of ports, which can then be connected either directly to devices or functions or to further hubs which have below them further devices or functions. A hub or the host controller may in addition incorporate functions if desired. In this manner a tree structure can be developed to allow a reasonable number of functions or devices to be attached to the serial bus system. The host controller connects to a bus in the computer system, for example the PCI bus, through the host controller. By having the host controller act as a concentrator, only a single connection to the PCI bus is necessary. The connection is better able to utilize the performance of that PCI bus without requiring numerous connections.

The host controller, each hub, and each function or port contain particular control registers for doing set up and initialization operations. In addition, three basic types of data transfer are defined in the serial bus system. The first type is isochronous, which is effectively a continuous real time transfer, such as telephony information or audio information. The second type is asynchronous block transfers, such as printer operations and conventional serial port operations, while the third type is asynchronous interactive device transfers, such as keyboard, mouse, pointing device, pen interfaces, and the configuration and status information, generally referred to as the control information, of the various devices.

Information is passed over the serial bus system when the host controller is a series of packets, with the host controller acting as the bus master and hubs and devices only responding upon request or polling access of the host controller. The packet types include data packets, token packets for use from host to device, a handshake packet and a special control packet. Data packets are the isochronous, asynchronous block, and asynchronous control types. Token packets allow transfer of data packets. Handshake packets are used to perform a ready handshake after transfer of a data or control packet to acknowledge successful receipt or indicate unsuccessful receipt. Special control packets are used for logical reset and status request transfers. Each function or device has a logical address.

Of most interest in this description are the three types of data transfers, isochronous, asynchronous block and control. It is noted that the control functions for both the isochronous and asynchronous block devices are done using control data transfers. An isochronous device needs a virtual channel having a given minimum bandwidth, so isochronous transfers must be requested or scheduled to have this minimum bandwidth. The bandwidth can be obtained by long block sizes and infrequent transfers, smaller block sizes and more frequent transfers, or a combination. An asynchronous block device need not have a guaranteed bandwidth, as they conventionally can have some flexibility in data transfer rates, but preferably the transfers must be robust so that when errors are detected, the transfer can be retried. Asynchronous devices come in essentially two types, high and low bandwidth. Higher bandwidth devices include printers and modems, while lower bandwidth devices are keyboards, mice and the like. The control functions are relatively low bandwidth. The control functions have essentially a onetime nature, being used mostly during system initialization and to prepare a device for a block transfer. In contrast, the isochronous and asynchronous block devices have a tendency to be very regular and thus operate differently from the control and interactive devices.

Each device and port on a hub or the host controller includes the capabilities to handle the low level bus transfer protocol between the particular node of the appropriate hub and the device itself. Thus, a relatively simple transfer protocol, with a limited number of packet types is defined.

However, of particular interest is the mechanism for allotting particular devices bandwidth in the serial bus system. In the preferred embodiment, the serial bus has a bandwidth of 5 to 20 Mb/sec, which must be split between the various devices. It is important that an isochronous device receive its guaranteed portion of that bandwidth, but it is also important that asynchronous block transfers and control transfers are not starved or overly delayed, if at all possible. Therefore, an arbiter or scheduler must be developed to properly coordinate the various transfers occurring in the serial bus system.

It is further desirable that the arbiter maximize utilization of the serial bus system at all times to allow the best performance of the devices in the serial bus system. It is further desired that significant portions of the arbiter be handled in hardware because of the greater speeds conventionally obtainable by hardware, in deference to the customarily slower operation of software based functions.

SUMMARY OF THE PRESENT INVENTION

A serial bus host controller according to the present invention utilizes an arbiter which organizes data transfer events into three categories, periodic data transfers, which are usually isochronous transfers; aperiodic transfers, which usually are asynchronous transfers and never are isochronous transfers; and control transfers. The arbiter fundamentally operates on a periodic basis. At the beginning of each period, the arbiter preferably alternates between periodic transfers and control transfers. When all of the periodic transfers have been completed, the arbiter then provides access to the various asynchronous transfers which are scheduled to occur, alternating with any remaining control transfers. In the preferred embodiment, the arbiter gives preference to the periodic events, and if any time within the period is available, which is referred to as the free time, control events are interleaved with periodic events until no free time remains or all are completed. Any remaining time in the period is used cycling through the aperiodic transfers. The arbiter of the preferred embodiment keeps a running total of free time during each period to determine if additional control or aperiodic transfers can occur.

By organizing the arbiter with related data queues in this fashion, software complexity is kept to a minimum, allowing the greatest use of the higher speed hardware and minimizing the use of the slower speed software to allow overall improved performance of the serial bus system.

BRIEF DESCRIPTION OF THE DRAWINGS

A better understanding of the present invention can be obtained when the following detailed description of the preferred embodiment is considered in conjunction with the following drawings, in which:

FIG. 4 is an arbitration queue diagram according to a first embodiment;

FIGS. 5A and 5B are arbitration queue diagrams of second and third embodiments;

FIG. 6 is an arbitration queue diagram according to the preferred embodiment;

FIG. 8A is a block diagram of a free time calculator utilized with the arbiter of FIGS. 7A and 7B; and FIG. 8B is an alternative embodiment of portions of FIG. 8A.

DETAILED DESCRIPTION OF THE PREFERRED EMBODIMENT

Figure 1:
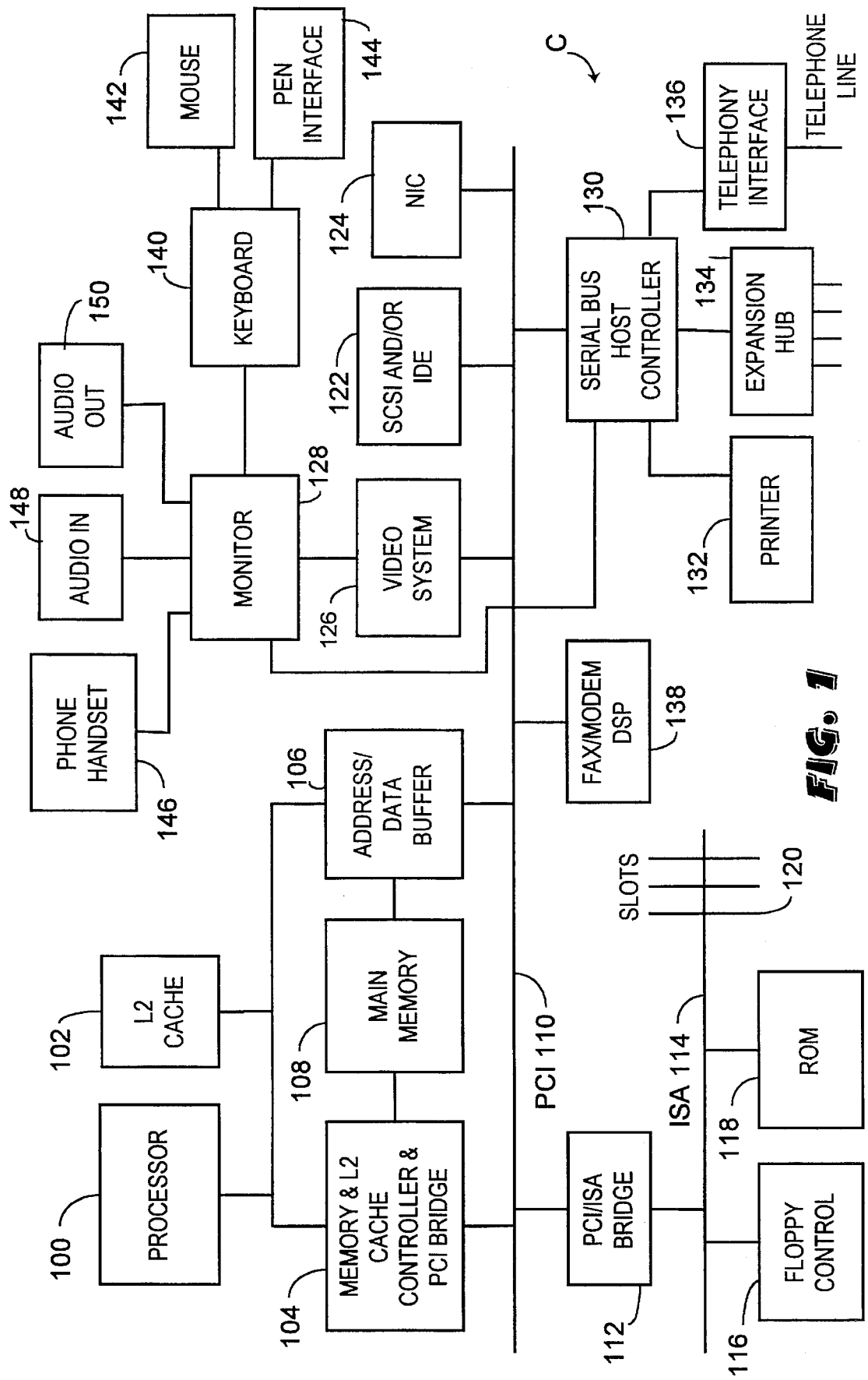
FIG. 1 is a block diagram of a computer system incorporating a serial bus system according to the preferred embodiment.

Referring now to FIG. 1, the computer system C according to the preferred embodiment is generally shown. The computer system C includes a processor 100 such as a Pentium® or 486 processor by Intel or their equivalents. It is understood that other processors could of course be utilized. The processor 100 is connected to a second level or L2 cache 102 and to a memory and L2 cache controller and PCI bridge 104 and address and data buffer 106. The main memory 108 of the computer system C is connected between the memory and L2 cache controller 104 and the address and data buffer 106. It is understood that the processor 100, cache 102, memory and cache controller 104, address and data buffer 106 and main memory 108 form the processor system and processor to PCI bus bridge according to a PCI system. It is understood of course that alternate processor systems and high speed bus architectures could be utilized if desired. Further, the address buffering could be included in the PCI bridge 104.

The PCI bridge 104 and address and data buffer 106 are connected to a PCI bus 110 which performs the high speed high performance back bone of the computer system C. A PCI to ISA (Industry Standard Architecture) bridge 112 is connected between the PCI bus 110 and an ISA bus 114. A floppy disk controller 116 is connected to the ISA bus 114, as is the system ROM (read only memory) 118. Additionally, there may be a plurality of ISA slots 120 connected to the ISA bus 114 for receiving interchangeable cards.

The majority of the devices are connected to the PCI bus 110. For example, a SCSI or IDE (Intelligent Drive Electronics) controller 122 is connected to the PCI bus 110 and to the associated disk drives and other devices (not shown). A network interface card (NIC) 124 is also connected to the PCI bus 110 to allow high performance network connections. Further, a video graphics system 126 is connected to the PCI bus 110 and to an associated monitor 128. A fax/modem DSP (digital signal processor) 138 can also be connected to the PCI bus 110 for fax and modem data processing. As noted, this is an exemplary computer system architecture and is provided for explanation, variations being readily apparent to one skilled in the art.

Of interest to the present description, a serial bus host controller 130 is also connected to the PCI bus 110. The serial bus host controller 130 of the illustrated embodiment acts as both a host controller and a hub, with various hubs and functions connected to the host bus controller 130. For example, a printer 132 is connected to one port of the serial bus host controller 130, while an expansion hub 134 providing for further expansion capabilities is connected to a second port. A telephony interface 136 containing the necessary CODEC and DAA components is connected to a third port and also receives a telephone line. The telephone line can be any of the available types such as an analog line, an ISDN line, a PBX connection and so on.

In the illustrated embodiment, the monitor 128 further acts as a hub and as a node. The monitor 128 is thus connected to one port of the serial bus host controller 130. The node or device function of the monitor 128 allows configuration of the monitor 128 independent from the high speed data utilized in the video system 126. The monitor 128 preferably acts as a hub because of the conventional physical arrangement of a modern computer system. Preferably, the system unit which contains the other devices is located under the desk or in a relatively remote location, with only the monitor 128, a keyboard 140, a pointing device such as a mouse 142 or pen 144, a telephone handset 146, and microphone and speakers relatively accessible to the user. As the monitor 128 effectively forms the central core of this unit, it is logically a proper location for a hub. The telephone handset 146 could be connected to one port of the monitor hub to receive digitized analog information either directly from the telephony interface 136 or as otherwise available, such as from an answering machine or voice mail function. The microphone is part of audio input circuitry 148 which is connected to a second port of the monitor hub, while audio output circuitry 150 contains the speakers used for audio output. The keyboard 140 further acts as a hub itself and a node, in that it is connected to the monitor hub but further contains ports to connect to the mouse 142 and a pen or stylus pointing device interface 144. This further physical connection is appropriate as those are the primary input devices and they are in most cases generally relatively near the keyboard 140 to ease use or operation.

Thus it can be seen that the relatively lower data rate operations are connected to the serial bus host controller 130 according to the serial bus system. Preferably, the printer 132 is set up and used with higher bandwidth asynchronous block transfers, while the telephony interface 136, the phone handset 146 and, in most cases, the audio input circuitry 148 and the audio output circuitry 150 are isochronous devices. The keyboard 140, mouse 142 and pen interface 144 can be treated as low bandwidth asynchronous block devices. In all cases, each one of the particular devices connected over the serial bus system includes control ports and configuration registers which need to be accessed by the processor 100 via the serial bus host controller 130 to allow control and setup of the individual devices.

Figure 2:
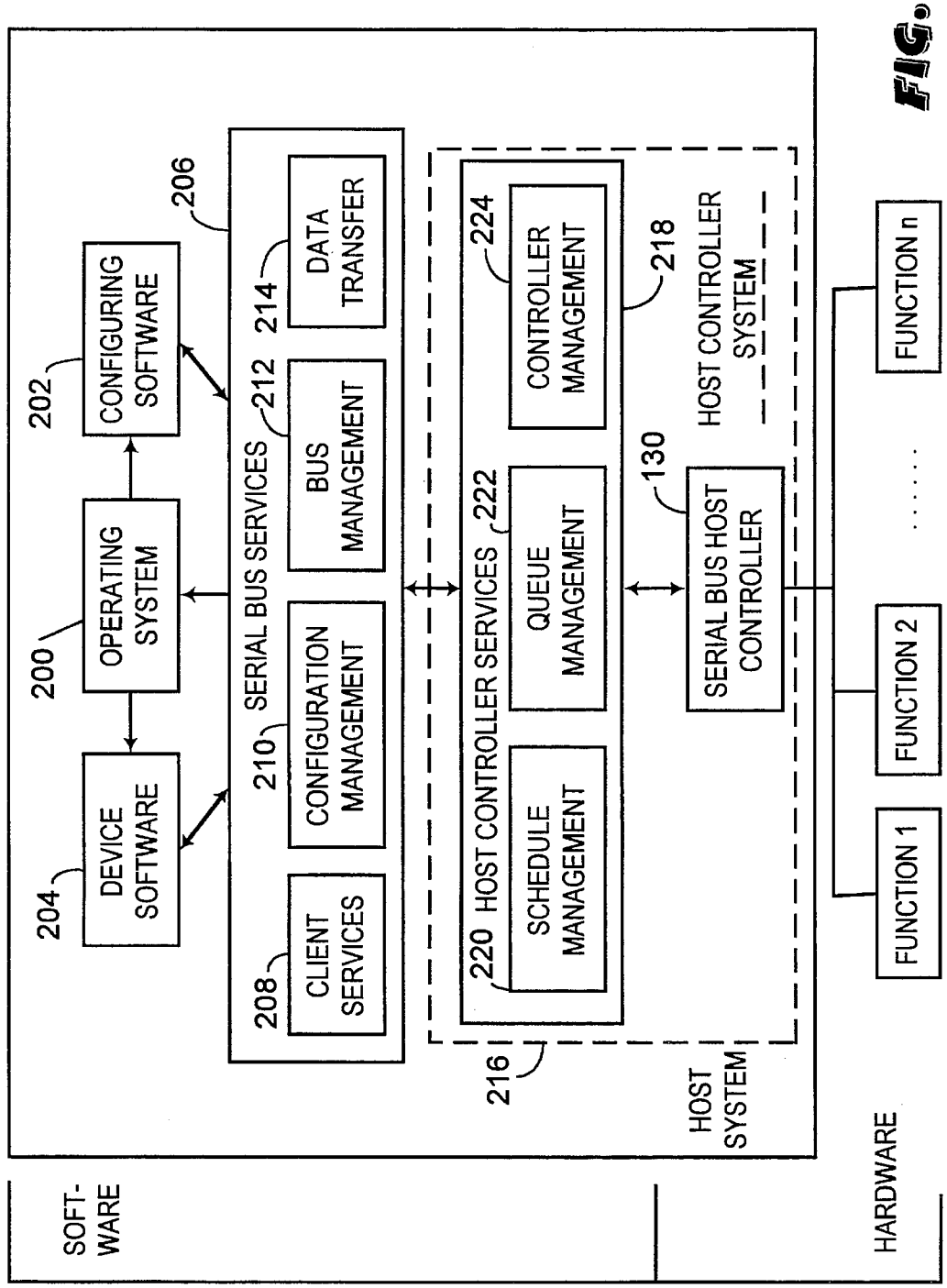
FIG. 2 is a block diagram illustrating partitioning of the various software and hardware functions in a serial bus system according to the preferred embodiment.

Turning now to FIG. 2, a block diagram of the serial bus system is illustrated. The illustration includes software and hardware components to allow an overview. For example, the operating system 200 will by definition communicate with the various serial bus devices. To this end it communicates with configuring software 202, which causes the particular devices to be properly configured, and with device driver software 204, which provides the primary data and control interface to the various devices. The device driver software 204 and the configuring software 202 interact with a layer referred to as serial bus services 206. The serial bus services 206 return data to both the device driver software 204 and the configuring software 202, and on occasion directly to the operating system 200. Serial bus services 206 provide four basic functions. The first is client services 208, which is utilized when the device driver software 204 and the configuring software 202 register with the serial bus services 206 and which provides event notifications back to the device driver software 204 and the configuring software 202. Serial bus services 206 also includes configuration management software 210, which tracks and keeps track of the organization of the various functions or devices in the serial bus system and also maintains the configuration state of each device. A bus management module 212 provides high level management of the operations of the serial bus system, such as bandwidth and power management for the devices, both isochronous and asynchronous, as required. Further, the bus management module 212 performs diagnostics. The fourth module is the data transfer module 214, which handles the actual data transfer between the configuring software 202 and the device software 204 and the host controller system 216.

The host controller system 216 is actually comprised of two portions, host controller services software 218 and the serial bus host controller 130. The host controller services software 218 includes three modules, the first of which is schedule management 220, which is responsible for actually organizing the polling of the particular transfers or channels to allow efficient or smooth operation. Effectively, the schedule management module 220 can be considered, in large part, the arbiter of the serial bus system. Queue management module 222 controls access to the various data queues. Controller management module 224 deals with the actual operation and configuration of the serial bus host controller 130 and provides certain functions and status information back to the serial bus services 206. The host controller services 218 thus interact directly with the serial bus host controller 130. The serial bus host controller 130 interacts with the various functions or devices according to the lower level serial bus protocol.

Figure 3:
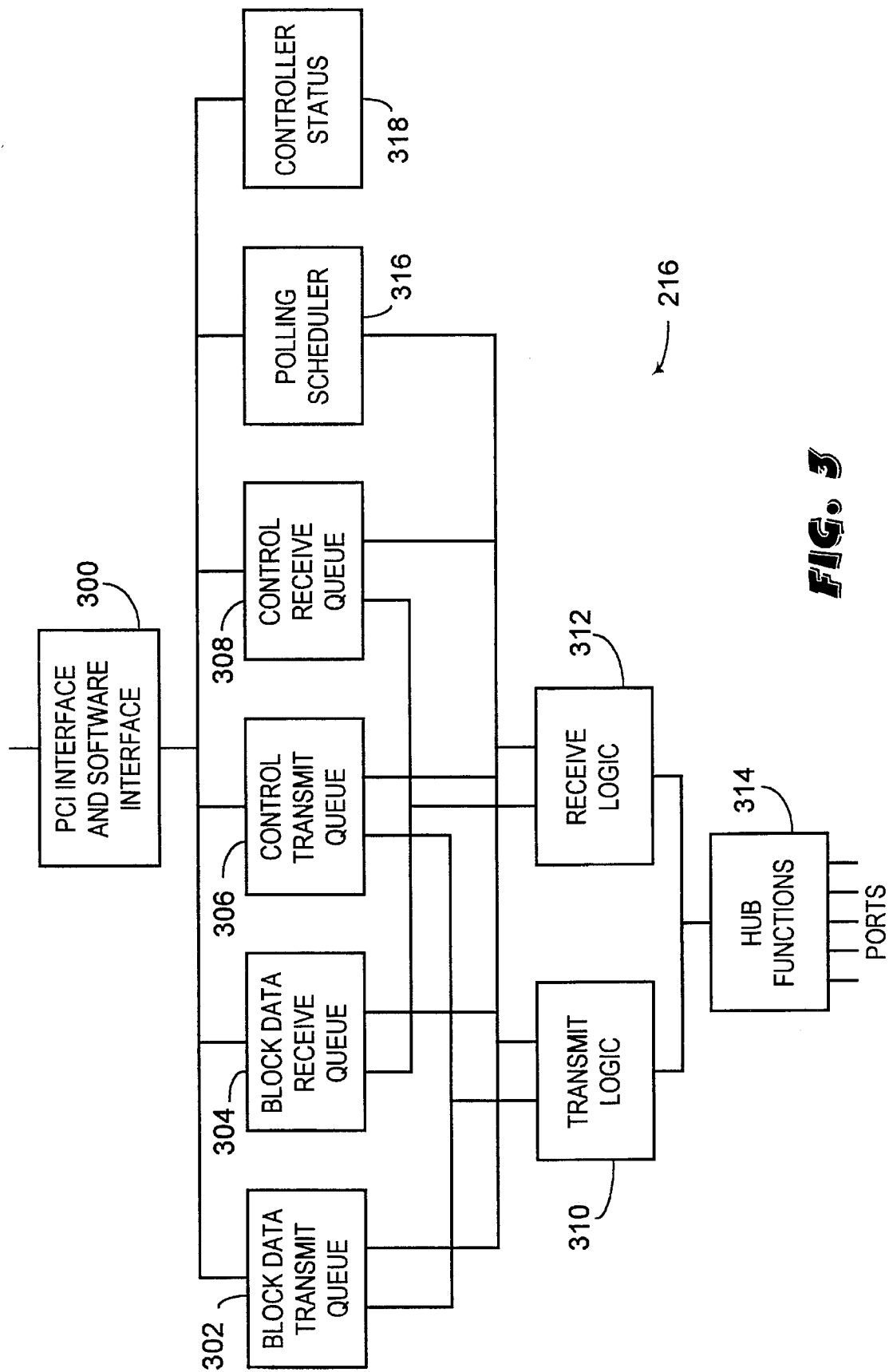
FIG. 3 is a block diagram of the host controller system of FIG. 2 illustrating the various logical blocks to be divided between the hardware and software of the host controller system.

Referring now to FIG. 3, a block diagram illustrating the logical operation and organization of the host controller system 216 is illustrated. A PCI bus 110 and software interface 300 is physically connected to the PCI bus 110 and logically connected to the serial bus services 206. Queue management module 222 of the host controller services 216 effectively handles four queues, the first and second queues being the block data transmit queue 302 and the block data receive queue 304. These are effectively the isochronous and asynchronous block transfer data queues. In addition, there are two further queues, the control transmit queue 306 and the control receive queue 308. These essentially are the logical transmit and receive queues for the control information. The transmit queues 302 and 306 are connected to transmit logic 310, while the receive queues 304 and 308 are connected to receive logic 312. The transmit and receive logic 310 and 312 are connected to hub functions 314, which in turn are connected to the actual ports of the host controller 130. A polling scheduler 316, which is effectively the function of the schedule management module 220, is connected to the various queues 302, 304, 306, and 308 and to the transmit and receive logic 310 and 312 so that packets are properly shuttled according to the operation of the polling scheduler 316. A controller status block 318 is connected to the hub functions 314 and to the interface 300 to act as the controller management module 224.

This is a logical organization and the actual separation of functions between the software and the hardware can vary. This description is primarily related to the hardware operations of the arbiter or polling scheduler 316 to minimize software complexities and to maximize overall performance. Various alternative arrangements are described below.

The arbiter inside the polling scheduler 316 can be organized a number of different ways. In all of these organizations, the polling scheduler 316 includes a periodic timer or tick counter to reset or reorganize and provide predetermined period time slices, so that isochronous transfers can be scheduled in a regular order. The periodic timer is preferably programmable and its operations is well known to those skilled in the art.

In a first organization of the arbiter connected to the polling scheduler 316, the arbitration of the various events scheduled to occur are kept in a single queue 320 as shown in FIG. 4. The various events as indicated are effectively the data transfer operations which are scheduled to occur. For example, an isochronous virtual channel is connected between the telephony interface 136 and the telephone handset 146 to allow a telephone call to be received. Then a series of isochronous data transfer packet requests would be placed into the queue 320 so that sufficient bandwidth is present, given the packet sizes and data transfer rates on the serial bus, to allow the telephone conversation to occur without interruption. In cases the data rate is relatively slow for an isochronous transfer, only one entry in the queue 320 is needed, whereas if a higher rate is desired, then several entries can be placed to allow greater total bandwidth. In addition, the packet sizes can be changed as desired to allow for greater flexibility.

Preferably, the isochronous transfer requests are placed at the head of the queue 320 so that when the arbiter begins traversing the queue at the start of each periodic interval, the isochronous transfers are completed first. One portion of the configuration management software 210 was to allocate overall bandwidths of the serial bus system given the various transfers of isochronous and asynchronous nature to guarantee that the isochronous transfers occur as desired. To this end, the configuration management software 210 performs calculations so that only sufficient isochronous transfers are present and the bandwidth is not completely utilized by those transfers.

In illustration of FIG. 4, asynchronous transfers are placed in the queue 320 following the isochronous transfers. For instance, this could include printer transfers. These are placed after the isochronous requests because by definition they are asynchronous and therefore more flexible. Thus they will be performed only after the isochronous transfers occur. After the asynchronous transfers the control transfers as assigned locations in the queue 320. Preferably, the control transfers are placed within the queue 320 so that they will execute within a reasonable period of time and not be starved.

Using only the single queue 320 as illustrated in FIG. 4, the schedule management module 220 of the host controller services 218 becomes quite difficult, especially as the number of isochronous transfers increases because after traversing the isochronous and asynchronous transfers there may be minimal time left for the control transfers, so that the schedule management module 220 must frequently be rearranging events in the queue 320 to assure that asynchronous and control transfers occur at least periodically at some minimum cycle rate. This is a relatively complex task and therefore for this reason it is undesirable to use the single queue arrangement. While the single queue 320 does simplify the hardware operations of the serial bus host controller 130 as only a single queue must be traversed, great emphasis is then placed in the schedule management software 220 to provide most of the actual scheduling and starvation control. As this increases software complexity and software conventionally runs slower than hardware, overall performance of the serial bus system is not maximized.

FIGS. 5A and 5B show a more preferable organization of the queues used by the arbiter in the scheduler 316. In FIG. 5A an isochronous queue 340 and an asynchronous queue 342 are utilized. In isochronous queue 340 contains only isochronous transfers and is preferably traversed once during each periodic interval, with this queue 340 being traversed first. The queue 342 contains asynchronous events such as the block transfers and the control transfers. The queue 342 is preferably treated in a circular manner with the control transfers being removed after execution. The control transfers are detected by identifying them as such using the packet header information. While this structure is a clear improvement over the single queue 320, in terms of reducing complexity of the schedule management module 220 in that now isochronous transfers are simply placed in and removed from the queue 340 as appropriate and the various asynchronous transfers, block or control, are placed in the queue 342 and only block transfers need be removed. Schedule management functions are, however, still required to maintain some order of the queue 342 to ensure that the control events happen within a reasonable period of time. The complexity of the software is significantly reduced but it is still present to some extent, in fact more than desirable given the data rates present.

FIG. 5B shows an alternative queue arrangement having a block transfer queue 346 and a control transfer queue 348. Block transfer queue 346 contains both the isochronous transfers and the asynchronous block transfers, preferably in the order of isochronous followed by asynchronous. Queue 346 preferably is traversed once each periodic interval, while the control queue 348 is traversed as time and events are available. Each control event is then removed after execution. This organization further simplifies the operation of the schedule management software 220 in that regular events simply are placed in the block queue 346, while the random or pseudo-random control requests are simply placed in a separate queue 348. This organization has the drawback that the control events follow the block events and so may starve if the various block events take the entire period and more. Therefore, the schedule management software 220 still must be aware of this possibility to appropriately handle the queues 346 and 348. Further, the schedule management software 220 may still need to rearrange the asynchronous transfers to prevent starvation.

Turning now to FIG. 6, the queue structure according to the preferred embodiment is illustrated. In this case there are three queues utilized by the arbiter, a periodic transfer queue 360, an aperiodic transfer queue 362 and a control transfer queue 364. All isochronous requests are placed in the periodic queue 360, while all asynchronous block transfers are generally placed in the aperiodic queue 362, though asynchronous block transfers can be placed in the periodic queue 360 if guaranteed bandwidth is desired. The various control events are placed in the control queue 364. Operation of the arbiter is further illustrated in the flowcharts of FIGS. 7A and 7B.

A cycle of operation for a given period commences at step 400 upon receipt of the periodic timer pulse or event. The arbiter moves the pointer of the periodic queue 360 to the top and then control proceeds to step 402 to determine if the free time available in the period is greater than zero. The configuration management software 210 and the schedule management software 220 will determine the calculated total amount of time utilized by the transfers in the periodic queue 360, usually just isochronous transfers, and the difference between this total calculated time and the total time defined by the periodic timer is the free time. Preferably, the free time is always greater than zero to guarantee that the aperiodic events and the control events actually do occur and are not fully starved. That guarantee of free time is a higher level function of the configuration management software 210 which coordinates bandwidth requests with the various device drivers 204 denying a request if the free time goes below zero and a reallocation cannot be performed.

Assuming that the free time is positive, the control then proceeds to step 404 to determine if there are any items in the control queue 364. If so, control proceeds to step 406 to determine if a read is pending from a prior read request provided in the control queue 364. To partially simplify operation of the serial bus host controller 130, preferably no further control operations proceed once a control operation has issued a read request to a device and the response has not been received. In an alternative embodiment, the read delay could occur on a device by device basis, but this would increase the complexity of the host controller 130 and is not the preferred embodiment. It is desirable to simply wait for the read return to avoid complexities in the host controller 130. If a read is pending, control proceeds to step 408 to determine if the read operation has timed out. It may very well be that a read was requested, but the device has not returned the results. If the read operation has not timed out, control proceeds to step 410 where a read token packet is passed to the particular device which has the read pending to determine if the device is now ready to respond. Control proceeds from the repeat read token step 410 to step 412.

If the time allowed for the read had completed in step 408 or no reads were pending in step 406, control proceeds to step 413 to determine if the remaining free time is sufficient to perform the next control item. If not, control proceeds to step 420. If so, control proceeds to step 414 where the next control item is executed and removed from the queue 364. Of course, if this was a read operation a read pending flag would be sent. Control proceeds from step 414 to step 412. In step 412, a determination is made whether the particular transfer requested by the control event has been completed. If so, control proceeds to step 416. If not, control proceeds to step 418 to determine if the particular response or acknowledgement from the function or device has timed out. If not, control returns to step 412 to wait for completion or time out. If the operation has completed or timed out, control proceeds from steps 412 and 418 to step 416. In step 416, the time actually required to do the transfer is subtracted from the free time value to determine the amount of free time remaining in this period.

Control then proceeds to step 420 to determine if any periodic items are present in the periodic queue 360. Control also proceeds to step 420 if the free time was not greater than zero in step 402 or no control items were present in step 404. If periodic items are present, control proceeds to step 422 where the next periodic item in the queue 360 is performed. Control then proceeds to step 424 to determine if the transfer is complete. If not, control proceeds to step 426 to determine if it has timed out. If not, control returns back to step 424. If a time out has occurred or the transaction has completed, control proceeds from steps 426 and 424 to step 428, where a change in free time is calculated. Preferably the host controller services 216 will know the calculated or approximate time for each periodic transfer. While FIG. 6 illustrates particular events in the queues 360, 362, and 364, preferably the queue entries are only entry points or indices into related tables. The table entries include control block information on each packet, such as address or addresses; packet type; packet size, both transmit and receive; location of the packet in main memory 108, which the host controller 130 can access using bus mastering capabilities; timeout period for the particular transfer; calculated time for the transfer, which generally should be at least the timeout period; and other related information. The table memory can be located in the host controller 130 for speed and to minimize PCI bus 110 traffic; can be located in a separate local memory or can be in the main memory 108. This calculated time can then be compared with the actual time required for the transfer to appropriately adjust the free time. If the transfer was completed in less than the calculated time, the difference can be added to the free time, whereas if the transfer took longer than desired, then the free time is reduced. It is understood that the actual time should usually be less than the calculated or requested time, but under certain conditions it may be possible for the actual time to exceed the requested time. Control then returns to step 402 to proceed in this loop.

If there were no periodic items in step 420, control proceeds to step 429, to determine if there is sufficient free time to perform the next aperiodic item. If not, control returns to step 402. If so, control proceeds to step 430 where the next aperiodic item in the aperiodic queue 362 is performed. Preferably, the aperiodic queue 362 is treated as a circular queue and just traversed without removal of any items. The periodic queue 360 is traversed once, top to bottom, while the control queue 364 is treated as a FIFO. The schedule management and configuration management software 220 and 210 are responsible for entering events in the aperiodic queue 362. The aperiodic transfer is executed and control proceeds to step 432 to see if it has been completed. If not, control proceeds to step 434 to determine if it has timed out. If not, control returns to step 432. If it has timed out in step 434 or has completed in step 432, control proceeds to step 436 where the amount of time required to do the aperiodic transfer is subtracted from the remaining free time to determine the total free time in this period. Control then returns to step 402. Preferably the aperiodic queue 362 contains all asynchronous items, both high and low bandwidth, the primary differences between high bandwidth devices and low bandwidth devices being the size of the data and to some extent the polling rate. Given this preferred embodiment, they are readily placed in the aperiodic queue 362, reserving the control queue 364 for only single event type transfers, not periodic polling operations.

With this arrangement, it is noted that should the amount of free time be relatively large, the aperiodic events are executed quite frequently. This generally will cause no problem in the device as the port handshaking will primarily be a dedicated hardware function. Further, this alleviates the problem of reordering the queue 362 when free time is small to avoid starvation. Further, the potential rapid polling is considered preferable to either dead bus time or defining a second period during which the asynchronous events must occur. However, the asynchronous items can be placed in the periodic queue 360 along with the isochronous items if this potential rapid polling is not desired.

It is noted that should the periodic timer count down to zero at any time during this entire process, a new period will commence and control will immediately return after the present transfer is completed to step 400 so that the periodic queue pointer is reset to the top, so that the periodic events can then be traversed during each period. If for some reason a control or aperiodic transfer is occurring when the periodic timer counts down to zero, the required additional completion time must be subtracted from the free time of the next period.

Figure 7A:
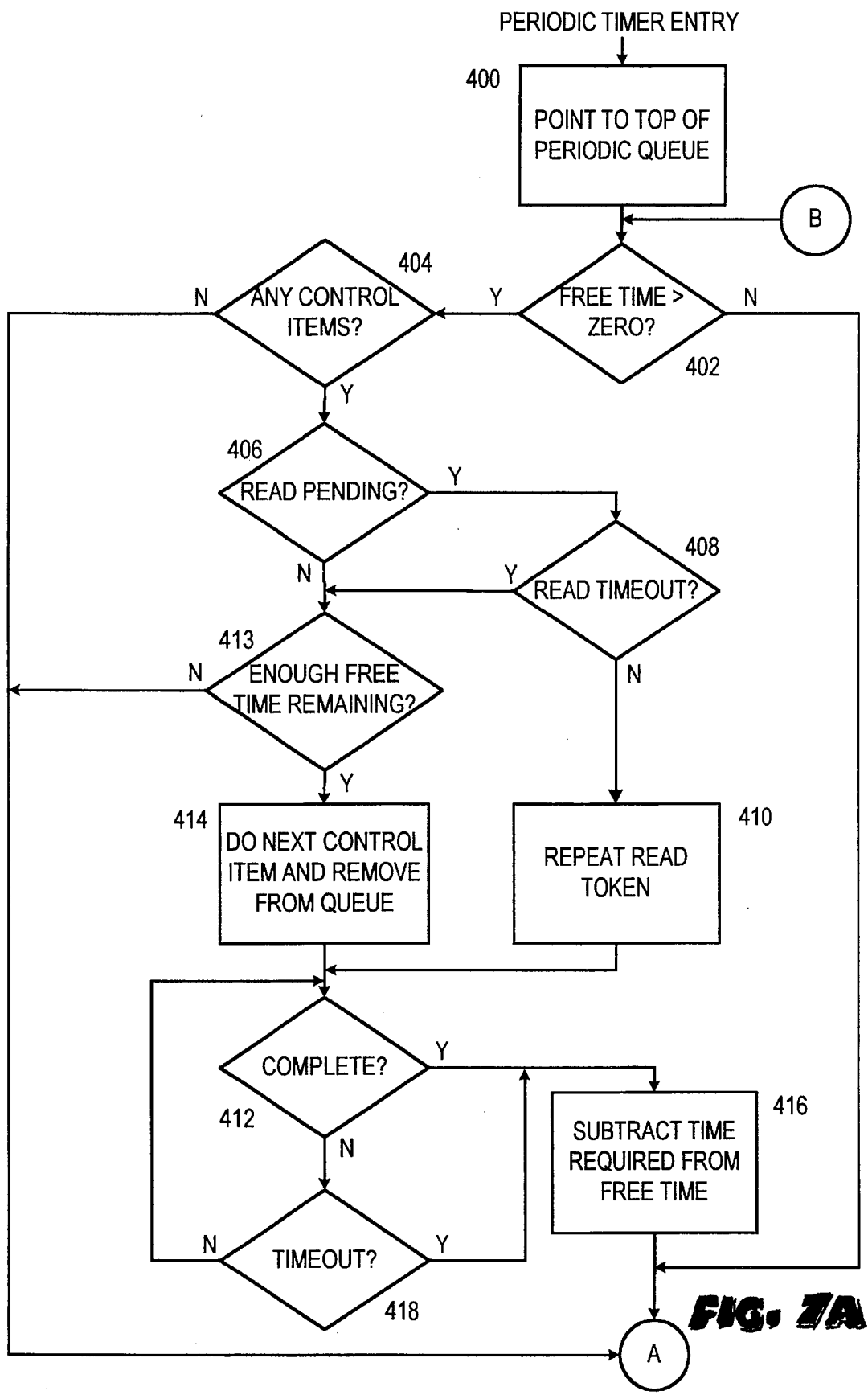
FIGS. 7A and 7B are a flowchart illustrating operation of the arbiter according to the preferred embodiment.
Figure 7B:
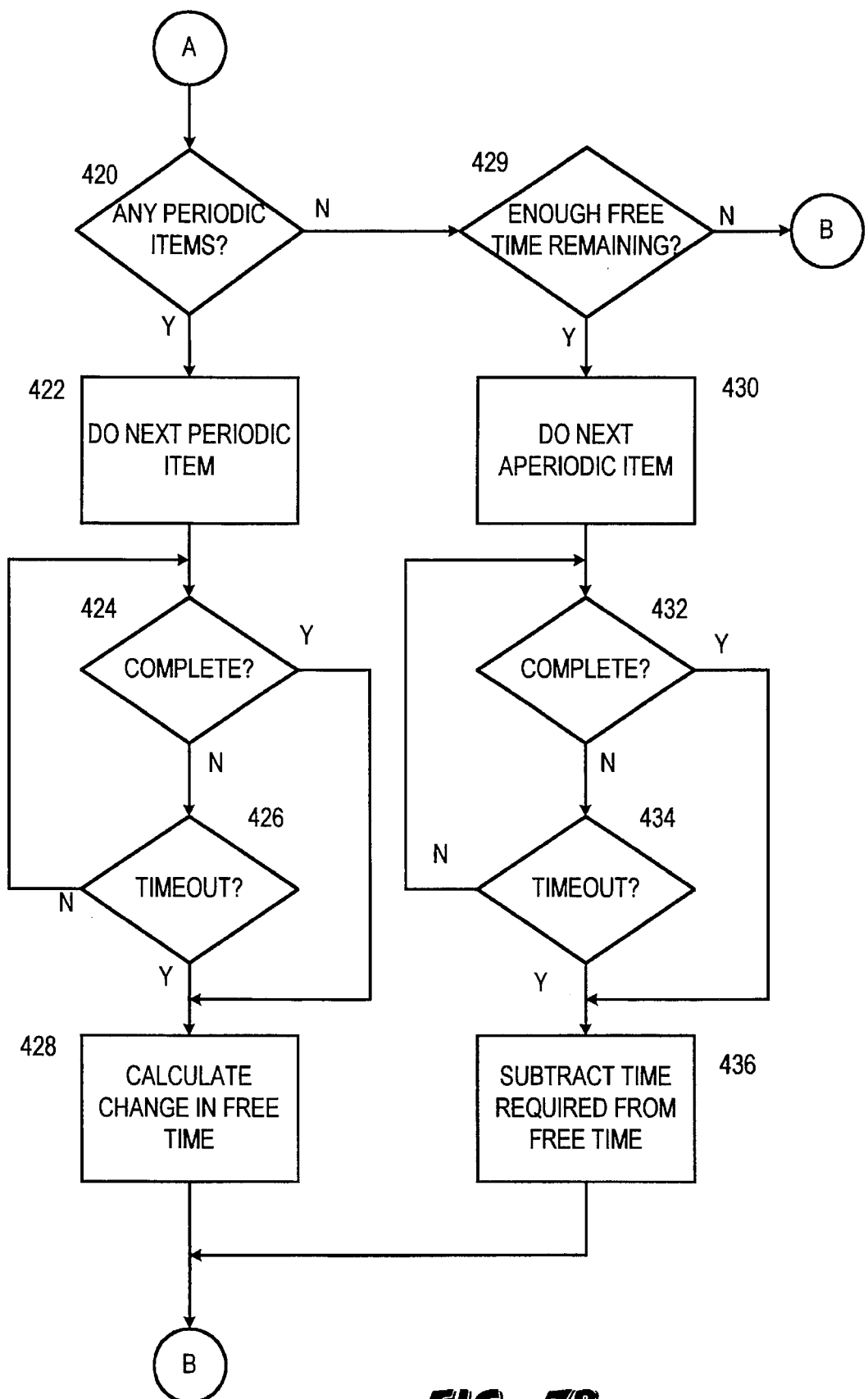

In this manner, control transfers, which are frequently very short, are given very high priority but will occur only if the periodic transfers provide any free time. After all of the periodic transfers have occurred, then aperiodic transfers will occur in a circular fashion, interleaved with any remaining control items. The use of the three queues 360, 362, and 364 in the arbitration flow as seen in FIGS. 7A and 7B provides the greatest simplicity to the schedule management module 220. The schedule management software 220 need only place the transfer request into the particular queue, with the arbiter then handling events from there. The software 220 is not required to periodically rearrange the queues as in the previous examples of FIGS. 4, 5A and 5B. This greatly simplifies the operation and because significant portions are being done with relatively simplistic hardware, an increase in performance of the overall operation of the serial bus system is developed.

Note that in various steps of the arbitration operation, a calculation of the remaining free time was required. This can be done as illustrated in FIG. 8A. Preferably, the host controller 130 contains a register 500 into which the schedule management software 220 stores the calculated total free time. This register 500 contains the value of the free time, that is, the result of total calculated isochronous and asynchronous transfer time for all events in the periodic queue 360 subtracted from the periodic time. This register 500 is connected to the one input of a multiplexor 502, which has its select input connected to the periodic timer pulse. The output of the multiplexor 502 is connected to the parallel load input of a free time register 504, which register 504 keeps track of the actual free time remaining. The free time register 504 is loaded by either a periodic timer event or the completion or time out of a particular transfer, be it isochronous, asynchronous, or control. The data outputs of the free time register 504 are provided to the positive input of an adder 506. A negative or subtracting input to the adder 506 is provided by the output of an adder 508. The positive or plus input of the adder 508 receives the actual time for a particular transfer. This is preferably kept by a simple timer that is initiated when the transfer is started and stopped when the transfer is completed. A negative or subtraction input of the adder 508 is provided by the output of a two input multiplexor 510. The selection of the multiplexor 510 is based on the presence of a periodic event. If a periodic event is not occurring, the zero input, which is connected to a zero value, of the multiplexor 510 is selected so that in this case the free time register value simply has subtracted from it the actual time required for the aperiodic or control event. However, when a periodic event was occurring, the calculated time for that particular event is provided to the one input of the multiplexor 510, so that in this case the free time value plus the calculated time value less the actual time value is provided at the output of the adder 506. The output of the adder 506 is connected to the zero input of the multiplexor 502, so that the free time register is then properly changed to maintain a free time value for utilization by the arbiter. The free time register 504 also contains a greater than zero output which is utilized by the arbiter in the decision step 402.

In an alternative embodiment, the calculated total free time register 500 can be replaced by a register 520 which receives the total calculated periodic event transfer time from the schedule management software 220 and the periodic timer reload register 522, which would in any case be present in the serial bus host controller 130 to maintain the periodic timer. The periodic timer time in the register 522 is provided to the positive or plus input of an adder 524 and the total calculated periodic event time is provided to the negative or subtracting input of the adder 524. The output of the adder 524 is then connected to the one input of the multiplexor 504 so that in this manner the software 220 does not have to calculate the total free time but rather it can simply provide the total calculated periodic event transfer time.

Thus is described a preferred arbiter utilizing three individual queues, one for each primary data type such that the arbiter is relatively simple and greatly simplifies the schedule management software 220 utilized in the host controller system 216. In this manner, serial bus system operations can be greatly enhanced by minimizing software requirements and yet not overly complicate the hardware.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. An arbiter for use in controlling operations, the operations including data transfers of a plurality of different data types including isochronous block data, asynchronous block data and asynchronous control data, the arbiter comprising:

a periodic timer for establishing a basic time period;

a periodic data transfer queue containing isochronous and asynchronous block data transfers;

an aperiodic data transfer queue containing asynchronous block data transfers;

a control data transfer queue containing control data transfers;

means for determining the free time in said basic time period after scheduling all periodic data transfers and performing any other transfers;

means for selecting the next transfer to be performed from one of said periodic queue, said aperiodic queue and said control queue, said means for selecting the next periodic data transfer if the free time is less than zero, alternating selection between the next periodic data transfer and the next control data transfer in each respective queue if the free time is greater than zero until all the free time becomes zero or all periodic data transfers completed and alternating between the next control data transfer and the next aperiodic data transfer if all periodic data transfers in the periodic queue have been completed and the free time is greater than zero.

2. The arbiter of claim 1, wherein said means for selecting removes a completed control data transfer from said control queue after completion of said transfer.

3. The arbiter of claim 1, wherein said means for selecting determines if a control data transfer was a read transfer and said read response has not been received and providing a read token instead of selecting the next control data transfer in said control queue.

4. The arbiter of claim 1, wherein said means for determining the free time stores the free time at the start of said basic period.

5. The arbiter of claim 4, wherein said means for determining the free time subtracts the time required for a control data transfer from the free time after completion of said control data transfer.

6. The arbiter of claim 5, wherein said means for determining the free time subtracts the time required for an aperiodic data transfer from said free time after completion of said aperiodic data transfer and wherein said means for determining the free time adds a calculated transfer time to said free time and subtracts an actual transfer time from said free time for a periodic data transfer after completion of said periodic data transfer.

7. The arbiter of claim 4, wherein said means for determining the free time subtracts the time required for an aperiodic data transfer from said free time after completion of said aperiodic data transfer.

8. The arbiter of claim 4, wherein said means for determining the free time adds a calculated transfer time to said free time and subtracts an actual transfer time from said free time for a periodic data transfer after completion of said periodic data transfer.

9. The arbiter of claim 4, wherein said means for determining the free time at the start of a basic period by subtracting a total calculated time for the periodic data transfers in said periodic queue from the basic time period.

10. A method for arbitrating operations, the operations including data transfers of a plurality of different data types including isochronous block data, asynchronous block data and asynchronous control data, the method comprising the steps of:

establishing a basic time period;

preparing a periodic data transfer queue containing requested isochronous and asynchronous data transfers;

preparing an aperiodic data transfer queue containing requested asynchronous data transfers;

preparing a control data transfer queue containing requested control data transfers;

determining the free time in said basic time period after scheduling all periodic data transfers and performing any other transfers;

selecting the next transfer to be performed from one of said periodic queue, said aperiodic queue and said control queue, said step of selecting the next periodic data transfer if the free time is less than zero, alternating selection between the next periodic data transfer and the next control data transfer in each respective queue if the free time is greater than zero until all the free time becomes zero or all periodic data transfers are completed and alternating between the next control data transfer and the next aperiodic data transfer if all isochronous data transfers in the periodic queue have been completed and the free time is greater than zero.

11. The method of claim 10, wherein said step of selecting removes a completed control data transfer from said control queue after completion of said transfer.

12. The method of claim 10, wherein said step of selecting determines if a control data transfer was a read transfer and said read response has not been received and providing a read token instead of selecting the next control data transfer in said control queue.

13. The method of claim 10, wherein said step of determining the free time stores the free time at the start of said basic period.

14. The method of claim 13, wherein said step of determining the free time subtracts the time required for a control data transfer from the free time after completion of said control data transfer.

15. The method of claim 14, wherein said step of determining the free time subtracts the time required for an aperiodic data transfer from said free time after completion of said aperiodic data transfer and wherein said means for determining the free time adds a calculated transfer time to said free time and subtracts an actual transfer time from said free time for a periodic data transfer after completion of said periodic data transfer.

16. The method of claim 13, wherein said step of determining the free time subtracts the time required for an aperiodic data transfer from said free time after completion of said aperiodic data transfer.

17. The method of claim 13, wherein said step of determining the free time adds a calculated transfer time to said free time and subtracts an actual transfer time from said free time for a periodic data transfer after completion of said periodic data transfer.

18. The method of claim 13, wherein said step of determining the free time at the start of a basic period subtracts a total calculated time for the periodic data transfers in said periodic queue from the basic time period.

* * * * *